(12) United States Patent  (10) Patent No.: US 7,940,611 B2
Washiya et al.  (45) Date of Patent: May 10, 2011

(54) OPTICAL DISC APPARATUS

(75) Inventors: Nobuhiro Washiya, Fujisawa (JP); Kazuhiko Ono, Yokohama (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 192 days.

(21) Appl. No.: 12/430,232

(22) Filed: Apr. 27, 2009

(65) Prior Publication Data

US 2009/0316538 A1    Dec. 24, 2009

(30) Foreign Application Priority Data

Jun. 24, 2008  (JP) .................................. 2008-164421

(51) Int. Cl.
*G11B 7/00* (2006.01)
(52) U.S. Cl. ................. 369/44.32; 369/44.25; 369/53.3; 369/53.28
(58) Field of Classification Search ............... 369/53.28, 369/53.43, 44.32, 44.27, 44.28
See application file for complete search history.

(56) References Cited

U.S. PATENT DOCUMENTS

2007/0040093 A1* 2/2007 Yoshikawa et al. ......... 250/201.5
2008/0235715 A1* 9/2008 Washiya et al. ............... 720/601

FOREIGN PATENT DOCUMENTS

| JP | 07-129978 | 5/1995 |
| JP | 09-305981 | 11/1997 |
| JP | 2006-079783 | 3/2006 |

* cited by examiner

*Primary Examiner* — Adam R Giesy
(74) *Attorney, Agent, or Firm* — Kilpatrick Townsend & Stockton LLP

(57) ABSTRACT

An optical disc apparatus comprises an overcurrent detector and when the overcurrent detector detects an overcurrent during a recording operation or a reproduction operation and during an operation for controlling a focus of an objective lens, a rotation speed of an optical disc is reduced and an actuator is controlled to cause the objective lens to be in a retracted state under the condition that a disc motor exerts brake force. The objective lens is in the retracted state until the rotation speed of the optical disc becomes equal to or smaller than a predetermined value and when the rotation speed of the optical disc is equal to or smaller than the predetermined value, the objective lens is released from the retracted state.

20 Claims, 5 Drawing Sheets ns OPTICAL DISC APPARATUS

CLAIM OF PRIORITY

The present application claims priority from Japanese patent application serial No. P2008-164421, filed on Jun. 24, 2008, the content of which is hereby incorporated by reference into this application.

BACKGROUND

1. Technical Field

The present invention relates to an optical disc apparatus, and more particularly to an optical disc apparatus having the function of monitoring a current flowing in an actuator provided in an optical pickup.

2. Description of the Related Art

JP-A-9-305981, JP-A-2006-79783, and JP-A-7-129978 describe conventional optical disc apparatuses. JP-A-9-305981 discloses that when the optical disc apparatus detects an unlocked state of a focus lock, and a focus search operation and a focus pull-in operation are performed, the position of an objective lens included in the optical disc apparatus is controlled and an optical pickup included in the optical disc apparatus moves to the position of an original track. The position of the objective lens is controlled to prevent the objective lens from moving toward an optical disc lest the objective lens collides with the optical disc. JP-A-2006-79783 discloses that an objective lens is positioned with a gap between the objective lens and a recording surface of an optical disc when a laser beam is turned off and an operation for a focus servo is not performed during loading or unloading of an optical disc. In the technique described in JP-A-2006-79783, after the optical disc is loaded and it is confirmed that a rotation speed of a spindle motor reaches a predetermined rotation speed, the laser beam is turned on. After that, a collision avoidance mode is released and a focus search operation starts. In order to unload the optical disc, the focus servo and a tracking servo are turned off. Then, the collision avoidance mode is turned on. After that, the laser beam is turned off and the rotation of the spindle motor is completely stopped. The operation for unloading the optical disc then starts. When it is confirmed that the optical disc moves to a safe location at which the optical disc does not collide with the objective lens, the collision avoidance mode is released. The optical disc apparatus described in JP-A-7-129978 detects that an objective lens comes too close to an optical disc during an operation for controlling a focus servo in order to prevent an optical head and the optical disc from colliding with each other when a vibration or a shock occurs. When the objective lens comes too close to the optical disc, the objective lens is forcibly driven to move away from the optical disc.

SUMMARY

For example, an optical disc apparatus records or reproduces information on or from, for example, an optical disc having a large capacity (such as an optical disc on or from which the information is recorded or reproduced by using a blue-based laser beam) under the condition that an edge of an objective lens included in an optical pickup is separated from a recording surface of the optical disc with a small gap. This may cause an overcurrent to flow in an actuator included in the optical pickup during the recording operation performed by the optical disc apparatus or during the reproduction operation performed by the optical disc apparatus. When the actuator stops controlling the objective lens to stop a movement of the objective lens in a direction in which a focus of the objective lens is adjusted, the edge of the objective lens or a protector portion of the objective lens may contact the recording surface of the optical disc due to a deviation of a rotational axis of the optical disc, and the recording surface may be scratched. A deviation (of the recording surface of the rotating optical disc) from the recording surface of the optical disc rotating without an axial deviation is larger toward the outer side of the recording surface. Therefore, when the objective lens is positioned on the outer side of the recording surface, the edge of the objective lens may easily contact the recording surface of the optical disc. The scratch due to the contact is larger and deeper as the optical disc rotates at higher speed in general.

Referring to FIG. 5, when a deviation of a rotational axis of an optical disc 2 occurs, a distance between a recording surface 2a of the optical disc 2 and a protector portion (edge portion) of an objective lens 5 is changed. In FIG. 5, the position $Q_1$ of the recording surface 2a illustrated by a solid line is changed to the position $Q_2$ of the recording surface 2a illustrated by a broken line due to the deviation of the rotational axis of the optical disc 2. When the recording surface 2a of the optical disc 2 is located at the position $Q_1$, the distance between the recording surface 2a and the protector portion (edge portion) of the objective lens 5 is d. On the other hand, when the recording surface 2a of the optical disc 2 is located at the position $Q_2$, the distance between the recording surface 2a and the protector portion (edge portion) of the objective lens 5 is zero. That is, when the recording surface 2a of the optical disc 2 is located at the position $Q_2$, the recording surface contacts the protector portion of the objective lens 5. When an overcurrent is not detected in an actuator, and an operation for recording information on the optical disc 2 or an operation for reproducing information from the optical disc 2 is in progress, the position of the objective lens 5 is controlled to maintain the distance d. That is, the recording surface 2a of the optical disc 2 is located at the position $Q_2$.

JP-A-9-305981 discloses that the objective lens is retracted and released from the retracted state under the condition that the optical disc rotates at a predetermined speed that allows information to be recorded on the optical disc and to be reproduced from the optical disc. For example, when an overcurrent flows in an actuator and the rotation speed of the optical disc is reduced, the objective lens is not retracted until the rotation of the optical disc is completely stopped. When a deviation of the rotational axis of the optical disc is large, a protector portion of the objective lens may contact a recording surface of the optical disc. In addition, JP-A-2006-79783 discloses that the objective lens moves away from the optical disc when the focus servo is in an OFF state and a shock is detected. In this technique described in JP-A-2006-79783, a current continuously flows in a focus coil in order to prevent the objective lens from colliding with the recording surface of the optical disc until the rotation of the optical disc is completely stopped. It is, however, considered that when a recording operation or reproduction operation is in progress (or the focus servo is in an ON state) and an overcurrent is detected in an actuator, the objective lens does not move away from the optical disc. In addition, JP-A-7-129978 discloses that the optical disc apparatus prevents the objective lens from coming too close to a recording surface of the optical disc when an operation for controlling a focus servo is in progress. For example, an overcurrent flows in an actuator provided in the optical disc apparatus. As a result, the operation for controlling the focus servo is stopped. The objective lens is not retracted under the condition that the rotation speed of the optical disc is reduced and the rotation of the optical disc is not completely stopped. When a deviation of the rotation axis of the optical disc is large, a protector portion of the objective lens may contact a recording surface of the optical disc.

In view of the above conventional optical disc apparatus, it is, therefore, an object of the present invention to provide an optical disc apparatus that prevents an edge or protector portion of an objective lens from contacting a recording surface of an optical disc until a rotation of the optical disc is stopped or almost stopped due to detection of an overcurrent flowing in an actuator included in an optical pickup and that thereby prevents the recording surface of the optical disc from being scratched.

An object of the present invention is to provide an optical disc apparatus which solves above mentioned problems and ensures reliability thereof.

The present invention can achieve the above object and solve the above problems.

The optical disc apparatus according to the present invention comprises: an overcurrent detector that detects an overcurrent flowing in an actuator provided in an optical pickup and instructs a disc motor to stop operating and exert brake force based on the result of the detection; a rotation speed detector that detects a rotation speed of the optical disc or a rotation speed of the disc motor generates and outputs a second signal based on the detected rotation speed; and a logic circuit that operates based on a first signal output from the overcurrent detector and on the second signal output from the rotation speed detector and generates a third signal when the level of the second signal is equal to or smaller than a standard level, the third signal causing a control signal (mute signal) to be supplied to an actuator controller from a controller, the control signal being used to instruct the actuator controller to stop an operation for controlling the actuator, wherein the rotation speed of the optical disc is reduced when an overcurrent flowing in an actuator is detected during a recording operation or reproduction operation and during an operation for controlling a focus of an objective lens; wherein the actuator is controlled to cause the objective lens to be in a retracted state under the condition that the disc motor exerts the brake force and the operation for controlling the focus is not performed, the objective lens being separated from the recording surface of the optical disc in the retracted state; wherein the objective lens is in the retracted state until the rotation speed of the optical disc becomes equal to or smaller than a predetermined value; and wherein the objective lens is released from the retracted state based on the third signal when the rotation speed of the optical disc is equal to or smaller than the predetermined value. The operation for controlling the actuator to cause the objective lens to be in the retracted state starts when the level of a radio-frequency signal generated by the optical pickup based on a laser beam reflected on the optical disc is equal to or smaller than a standard value.

DETAILED DESCRIPTION OF THE PREFERRED EMBODIMENT

An embodiment of the present invention is described below with reference to the accompanying drawings.

Figure 1:
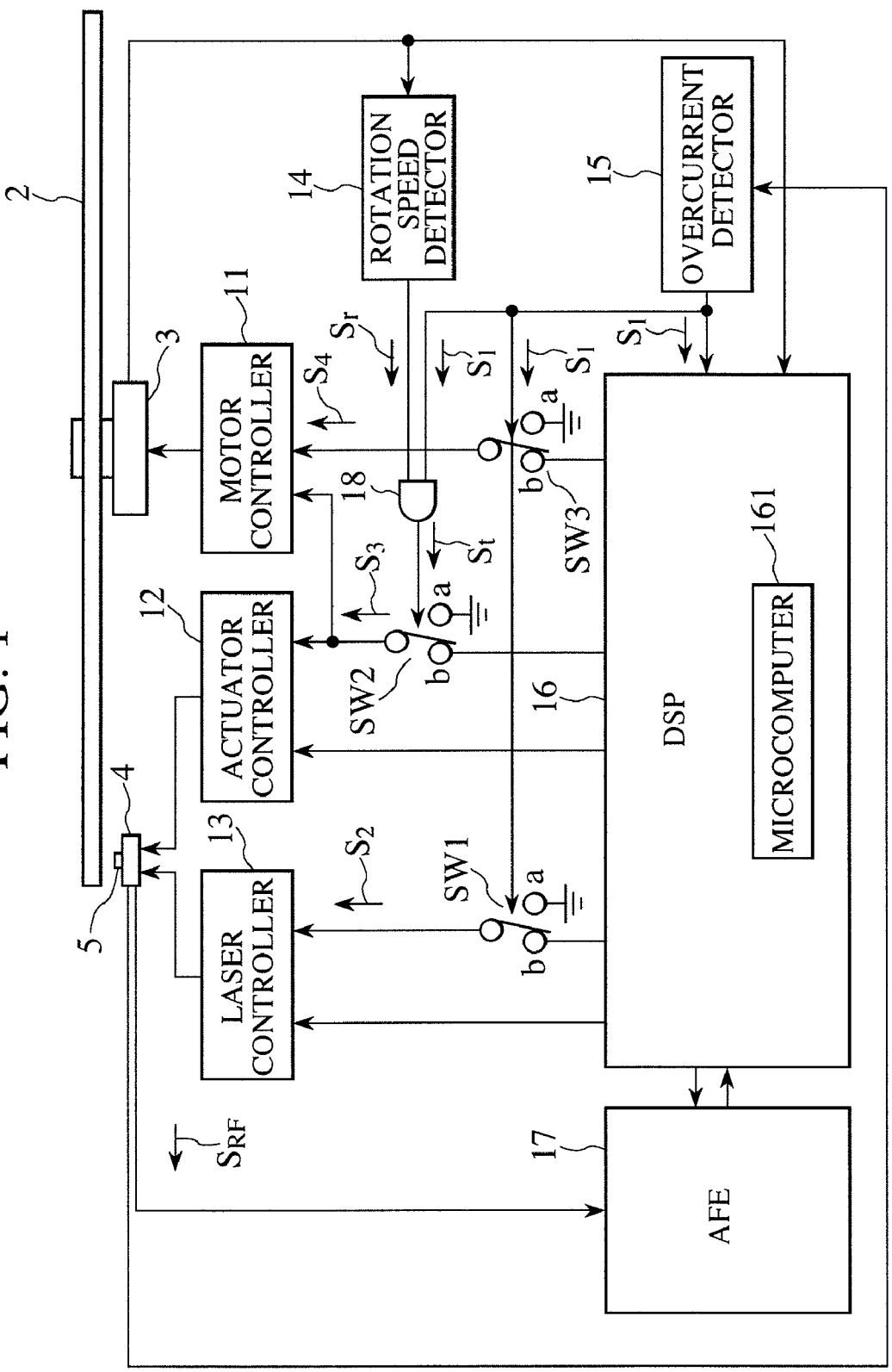
FIG. 1 is a diagram showing the configuration of an optical disc apparatus according to an embodiment of the present invention.
Figure 2:
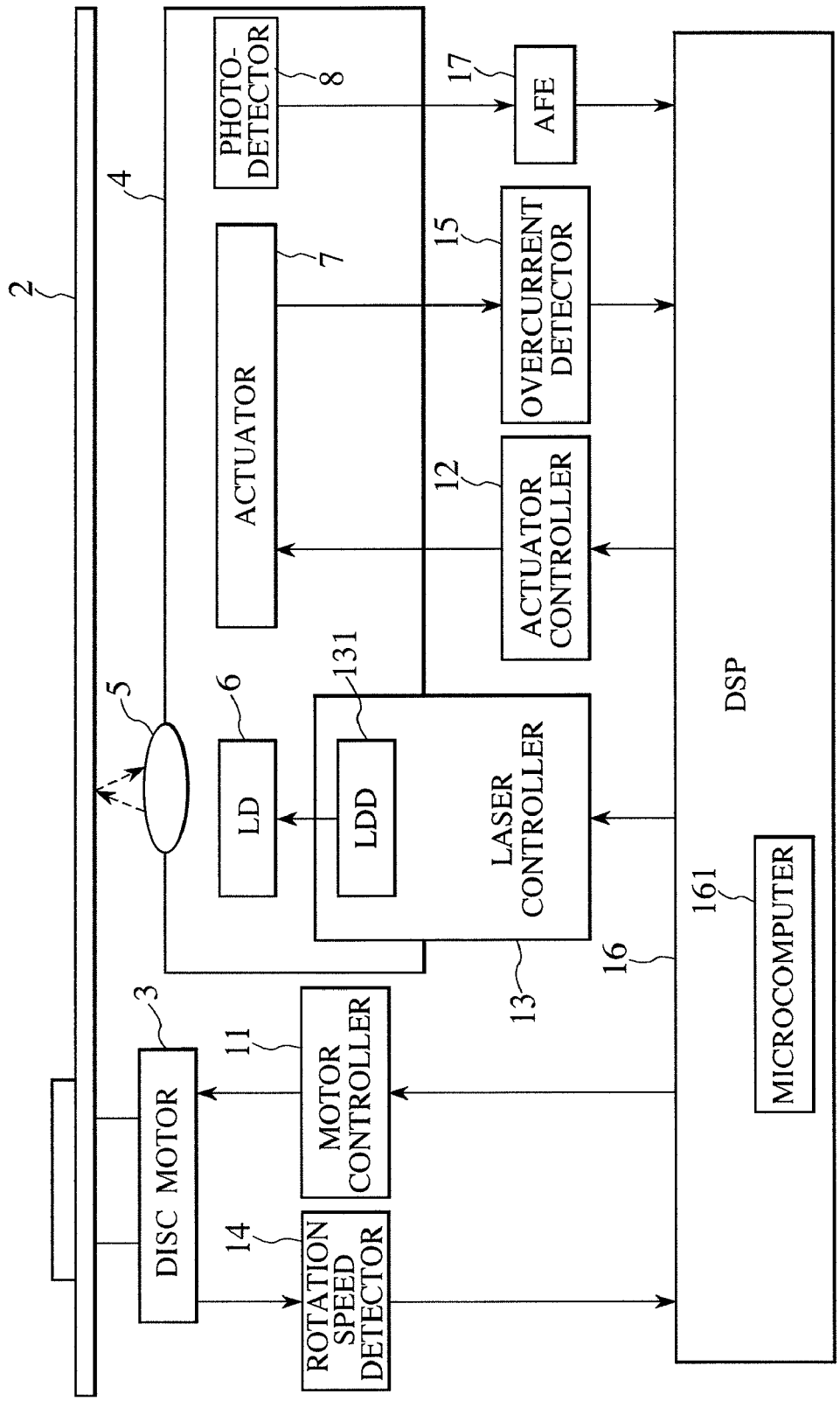
FIG. 2 is a diagram showing the configuration of an optical pickup included in the optical disc apparatus shown in FIG. 1.
Figure 3:
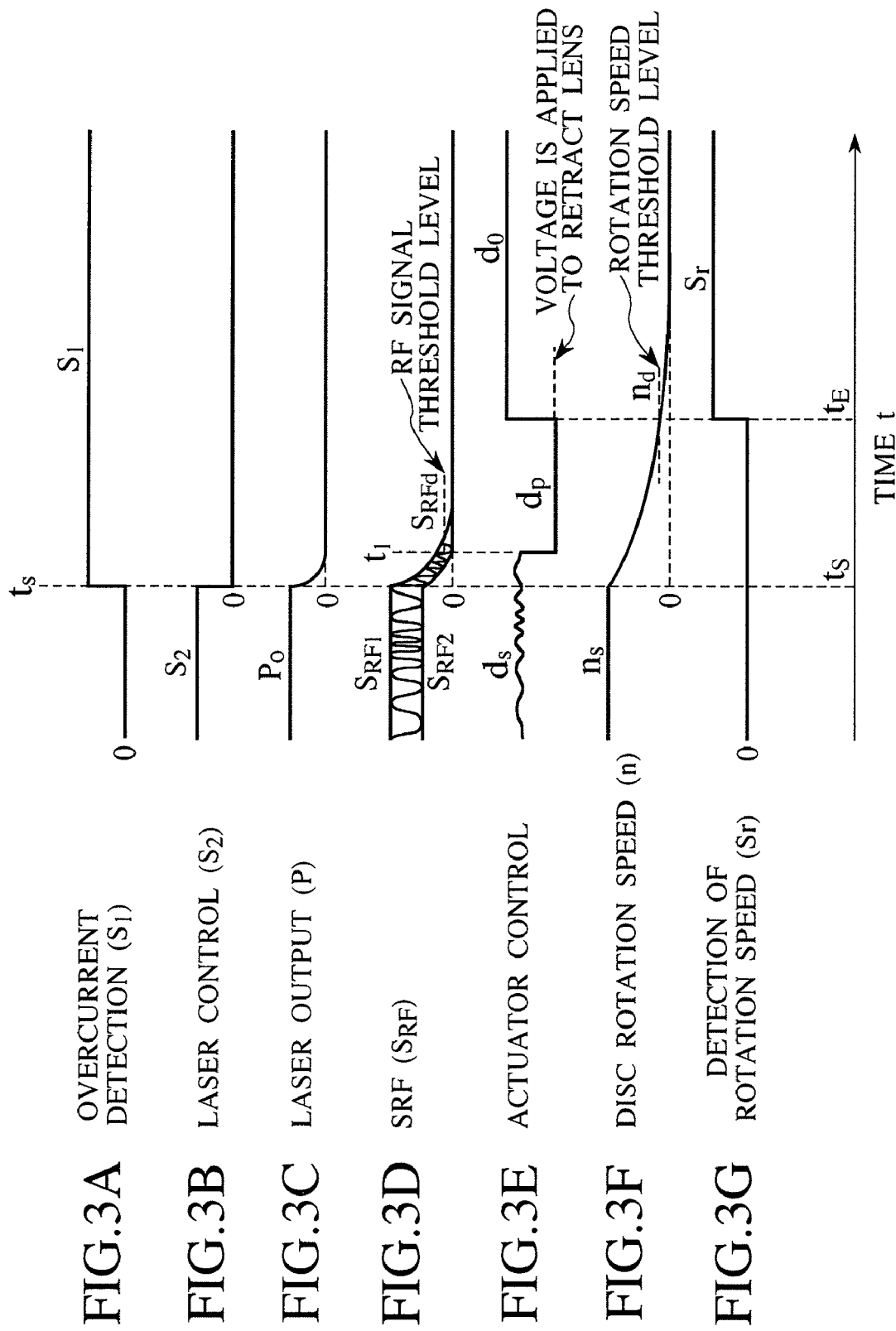
FIGS. 3A to 3G are graphs showing operating states of parts when an overcurrent is detected in an actuator included in the optical disc apparatus shown in FIG. 1.
Figure 4:
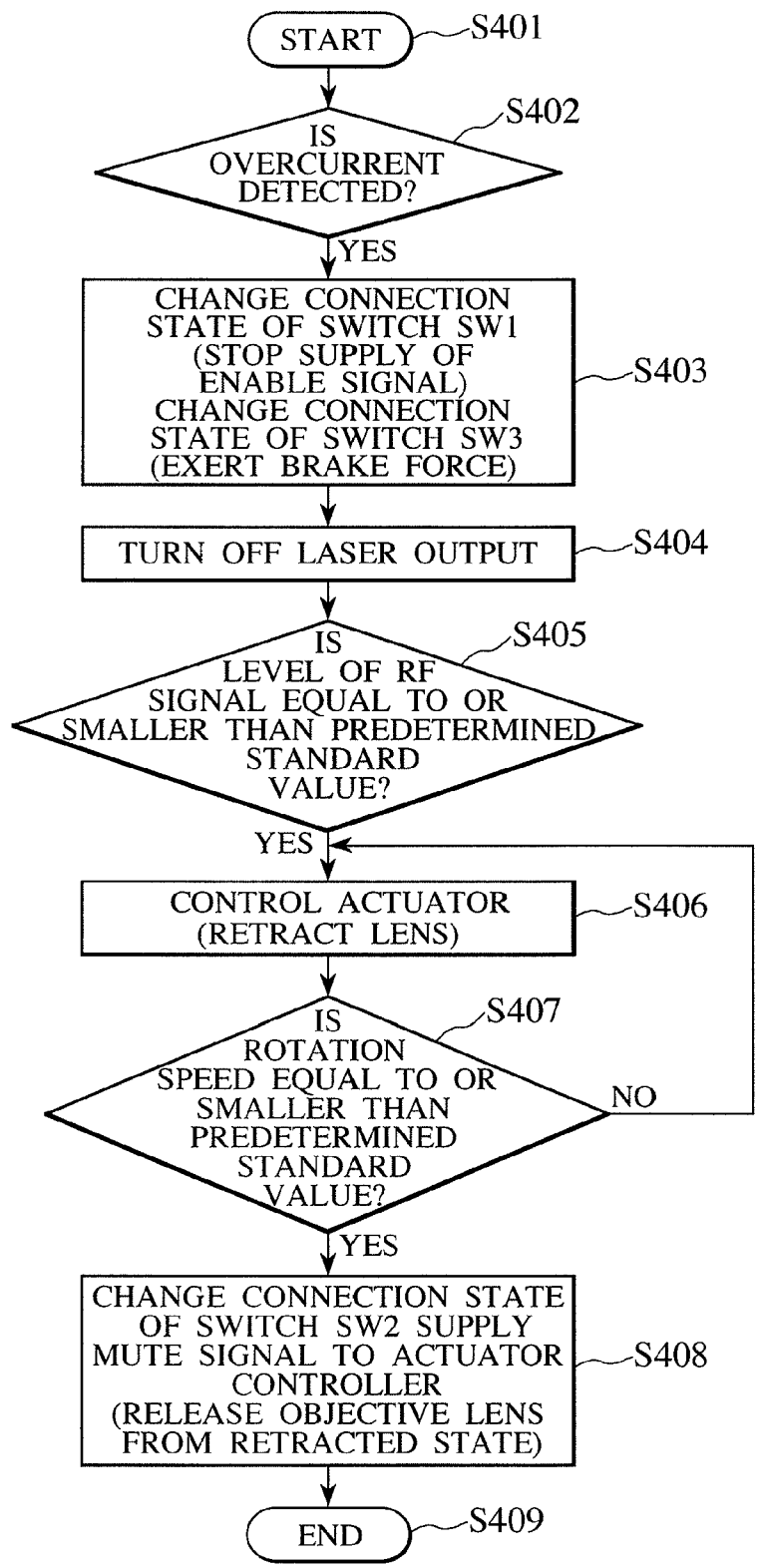
FIG. 4 is a flowchart showing operations of the optical disc apparatus shown in FIG. 1 after an overcurrent is detected in the actuator included in the optical disc apparatus.
Figure 5:
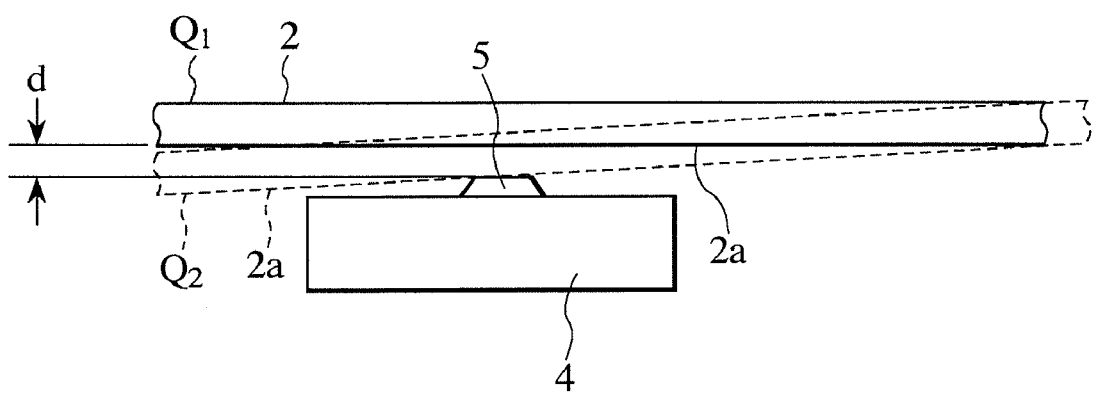
FIG. 5 is a diagram showing main parts of the optical disc apparatus according to the present invention.

FIGS. 1 to 4 are diagrams to explain the embodiment of the present invention. FIG. 1 shows the configuration of an optical disc apparatus according to the embodiment of the present invention. FIG. 2 shows the configuration of an optical pickup included in the optical disc apparatus shown in FIG. 1. FIGS. 3A to 3G show operating states of parts when an overcurrent is detected in an actuator included in the optical disc apparatus shown in FIG. 1. FIG. 4 is a flowchart showing operations of the optical disc apparatus shown in FIG. 1 after an overcurrent is detected in the actuator included in the optical disc apparatus.

In FIG. 1, reference numeral 2 denotes the optical disc serving as a medium for storing information; 3, a disc motor for rotationally driving the optical disc 2; 4, an optical pickup; 5, an objective lens; 11, a motor controller; 12, an actuator controller; 13, a laser controller; 14, a rotation speed detector; 15, an overcurrent detector; 16, a digital signal processor (DSP); 161, a microcomputer; 17, an analog front end (AFE); and 18, a logic circuit. The motor controller 11 is adapted to rotationally drive the disc motor 3 and control the rotational state of the disc motor 3. The actuator controller 12 is adapted to control the actuator included in the optical pickup 4 and thereby cause the objective lens 5 to be in a focus-controlled state or in a retracted state. In the retracted state, the objective lens 5 is separated from a recording surface (facing the objective lens 5) of the optical disc 2. The laser controller 13 is adapted to drive and control a laser diode that generates a laser beam in the optical pickup 4. The rotation speed detector 14 is adapted to detect a rotation speed of the optical disc 2 or a rotation speed of the disc motor 3 based on, for example, back electromotive force generated by a frequency generator or on back electromotive force generated by a stator coil included in the disc motor 3. When the rotation speed of the optical disc or the rotation speed of the disc motor 3 is larger than a predetermined standard value, the rotation speed detector 14 does not output a signal (hereinafter called a second signal $S_r$). When the rotation speed of the optical disc or the rotation speed of the disc motor 3 is equal to or smaller than the predetermined standard value, the rotation speed detector 14 generates and outputs the second signal $S_r$. The overcurrent detector 15 is adapted to detect an overcurrent flowing in the actuator and generate and output a first signal $S_1$ based on the result of the detection. The DSP 16 serves as a controller for controlling the entire optical disc apparatus. The microcomputer 161 is embedded in the DSP 16. The AFE 17 is adapted to amplify a radio frequency (RF) signal $S_{RF}$ generated by the optical pickup 4 based on a laser beam reflected on the optical disc 2. The AFE 17 is also adapted to shape the waveform of the RF signal $S_{RF}$. The logic circuit 18 is adapted to generate and output a third signal $S_t$ based on the first signal $S_1$ output from the overcurrent detector 15 and on the second signal $S_r$ output from the rotation speed detector 14. The third signal $S_t$ causes a control signal, i.e., a mute signal $S_3$ to be supplied from the DSP 16 to the actuator controller 12. The mute signal $S_3$ is used to instruct the actuator controller 12 to stop an operation for controlling the actuator 7. The overcurrent detector 15 generates the first signal $S_1$ and outputs the first signal $S_1$ to the DSP 16. The DSP 16 receives the first signal $S_1$ and transmits a control signal $S_4$ to the motor controller 11 based on the first signal $S_1$. The control signal $S_4$ is used to cause the disc motor 3 to exert brake force.

A switch SW1 is provided between the DSP 16 and the laser controller 13. The switch SW1 is adapted to permit and stop supply of a control signal, i.e., an enable signal $S_2$ from the DSP 16 to the laser controller 13. The laser controller 13 causes the laser diode to output a laser beam based on the enable signal $S_2$. A switch SW2 is provided between the DSP 16 and the actuator controller 12. The switch SW2 is adapted to permit and stop supply of the mute signal $S_3$ from the DSP 16 or a ground to the actuator controller 12 and the motor controller 11. The mute signal $S_3$ is used to instruct the actuator controller 12 to stop the operation for controlling the actuator 7. A switch SW3 is provided between the DSP 16 and the motor controller 11. The switch SW3 is adapted to permit and stop supply of the control signal $S_4$ from the DSP 16 to the motor controller 11. The control signal $S_4$ is used to instruct the disc motor 3 to stop operating. In addition, the control signal $S_4$ is used to instruct the disc motor 3 to exert the brake force. Each of the switches SW1 to SW3 is composed of a circuit switch having a semiconductor and the like. When the logic circuit 18 receives the first signal $S_1$ and does not receive the second signal $S_r$, the logic circuit 18 does not generate the third signal $S_t$. When the logic circuit 18 receives the first signal $S_1$ and the second signal $S_r$, the logic circuit 18 generates and outputs the third signal $S_t$. Each of the switches SW1 and SW3 is turned on and off based on the first signal $S_1$ output from the overcurrent detector 15. The switch SW2 is turned on and off based on the third signal $S_t$ output from the logic circuit 18. The switch SW1 has a terminal b. When the terminal b of the switch SW1 is in an ON state (closed state), the switch SW1 permits the supply of the enable signal $S_2$ from the DSP 16 to the laser controller 13. The switch SW2 has a terminal b. When the terminal b of the switch SW2 is in an ON state (closed state), the switch SW2 permits the supply of the mute signal $S_3$ from the DSP 16 or the ground to the actuator controller 12 and the motor controller 11. The switch SW3 has a terminal b. When the terminal b of the switch SW3 is in an ON state (closed state), the switch SW3 permits the supply of the control signal $S_4$ from the DSP 16 to the motor controller 11. The control signal $S_4$ is used to instruct the disc motor 3 to stop operating. In addition, the control signal $S_4$ is used to instruct the disc motor 3 to exert the brake force.

In FIG. 2, reference numeral 6 denotes the laser diode provided in the optical pickup 4; 7, the actuator provided in the optical pickup 4; 8, a photodetector; and 131, a laser drive circuit. The photodetector 8 is provided in the optical pickup 4. The photodetector 8 is adapted to receive a laser beam reflected on the recording surface of the optical disc 2 through the objective lens 5, convert the received laser beam into an electric signal, and output the electric signal. The laser drive circuit 131 is provided in the laser controller 13 and adapted to drive the laser diode 6. The same reference numerals as those shown in FIG. 2 denote the same elements as those shown in FIG. 1.

In each of FIGS. 1 and 2, when the terminal b of the switch SW1 is in the ON state (closed state), the switch SW1 permits the supply of the enable signal $S_2$ from the DSP 16 to the laser controller 13. The laser drive circuit 131 drives the laser diode 6 to cause the laser diode 6 to output a laser beam based on the enable signal $S_2$. The switch SW1 also has a terminal a. When the terminal a of the switch SW1 is in an ON state (closed state), the switch SW1 stops the supply of the enable signal $S_2$ from the DSP 16 to the laser controller 13 and the laser drive circuit 131 does not drive the laser diode 6. In this case, the laser diode 6 does not output a laser beam. The first signal $S_1$ output from the overcurrent detector 15 sets the switch SW1 to ensure that the terminal b of the switch SW1 is in an OFF state (open state) and that the terminal a of the switch SW1 is in an ON state (closed state). In this case, the switch SW1 stops the supply of the enable signal $S_2$ from the DSP 16 to the laser controller 13.

The switch SW2 also has a terminal a. When the terminal a of the switch SW2 is in an ON state (closed state), the switch SW2 permits the supply of the mute signal $S_3$ from the DSP 16 to the actuator controller 12. The mute signal $S_3$ is used to instruct the actuator controller 12 to stop the operation for controlling the actuator 7. On the other hand, when the terminal b of the switch SW2 is in an ON state (closed state), the switch SW2 permits supply of a control signal from the DSP 16 to the actuator controller 12. In this case, the control signal is used to instruct the actuator controller 12 to control the actuator 7 that controls the objective lens 5. That is, the control signal is used to instruct the actuator 7 to cause the objective lens 5 to be in the retracted state. The actuator controller 12 starts to control the actuator 7 in order to cause the objective lens 5 to be in the retracted state when the level of a radio frequency (RF) signal $S_{RF}$ generated by the optical pickup 4 based on the laser beam reflected on the optical disc 2 is equal to or smaller than a predetermined standard value. In the retracted state, the objective lens 5 is positioned to ensure that an edge or protector portion of the objective lens 5 is separated from the recording surface of the optical disc 2 with a gap larger than a deviation (of the recording surface of the rotating optical disc 2) from the recording surface of the optical disc 2 rotating without an axial deviation and that the objective lens 5 does not contact the recording surface of the optical disc 2. When the terminal b of the switch SW2 is in an OFF state (open state), the mute signal $S_3$ is supplied from the ground to the actuator controller 12 and the objective lens 5 is released from the retracted state. The switch SW3 also has a terminal a. The third signal $S_t$ output from the logic circuit 18 sets the switch SW3 to ensure that the terminal a of the switch SW3 is in an ON state (closed state) and that the terminal b of the switch SW3 is in an OFF state (open state). In this case, the mute signal $S_3$ is supplied from the ground to the actuator controller 12.

When the overcurrent detector 15 detects an overcurrent flowing in the actuator during an operation for recording information on the optical disc 2 by the optical disc apparatus or during an operation for reproducing information from the optical disc 2 by the optical disc apparatus, the overcurrent detector 15 generates and outputs the first signal $S_1$. The first signal $S_1$ is input to the switch SW1, the switch SW3, the logic circuit 18 and the DSP 16. The first signal $S_1$ causes the terminal a of the switch SW1 to be in the ON state (closed state) so as to stop the supply of the enable signal $S_2$ from the DSP 16 to the laser controller 13. Then, the laser drive circuit 131 stops the operation for driving the laser diode 6. The laser diode 6 then stops outputting the laser beam. Since the laser diode 6 stops outputting the laser beam, the level of the radio frequency signal $S_{RF}$ is gradually reduced. In this case, the microcomputer 161 provided in the DSP 16 determines the level of the radio frequency signal $S_{RF}$. When the level of the radio frequency signal $S_{RF}$ is equal to or lower than a predetermined standard value, the DSP 16 generates a control signal that is used to instruct the actuator controller 12 to control the actuator 7 in order to ensure that the actuator 7 causes the objective lens 5 to be in the retracted state. This control signal is transmitted from the DSP 16 to the actuator controller 12. The actuator controller 12 receives the control signal from the DSP 16 and then controls the actuator 7. Then, the actuator 7 causes the objective lens 5 to be in the retracted state. When the terminal b of the switch SW3 is set to be in the OFF state (open state) by means of the first signal $S_1$, the control signal $S_4$ is supplied from the ground to the motor controller 11. The control signal $S_4$ is used to instruct the disc motor 3 to stop operating. In addition, the control signal $S_4$ is used to instruct the disc motor 3 to exert the brake force. The disc motor 3 is stopped, and the rotation speed of the optical disc 2 is reduced due to the brake force exerted by the disc motor 3. In order to exert the brake force by the disc motor 3, the stator coil of the disc motor 3 is short-circuited. Alternatively, in order to exert the brake force, a voltage having a polarity opposite to that of a voltage applied to the stator coil in order to drive the disc motor 3 is applied to the stator coil.

When the disc motor 3 stops operating, the rotation speed of the optical disc 2 or the rotation speed of the disc motor 3 is gradually reduced. In addition, the brake force increases the rates of the reductions in the rotation speed of the disc motor 3 and in the rotation speed of the optical disc 2. Thus, the brake force reduces the length of time for stopping the rotation of the optical disc 2 and the length of time for stopping the rotation of the disc motor 3. When the rotation speed of the disc motor 3 and the rotation speed of the optical disc 2 are reduced, the actuator 7 causes the objective lens 5 to be in the retracted state. Therefore, the objective lens 5 does not contact the recording surface of the optical disc 2 that is in the rotating state while the rotation speed of the optical disc 2 is reduced. The rotation speed detector 14 detects the rotation speed of the optical disc 2 or the rotation speed of the disc motor 3 in the above state as a voltage signal level. The rotation speed detector 14 compares the voltage signal level corresponding to the detected rotation speed with a predetermined standard value. When the voltage signal level is larger than the standard value, the rotation speed detector 14 does not output the second signal $S_r$. When the voltage signal level is equal to or smaller than the standard value, the rotation speed detector 14 outputs the second signal $S_r$ to the logic circuit 18. On the other hand, the overcurrent detector 15 outputs the first signal $S_1$ to the logic circuit 18.

The logic circuit 18 generates and outputs the third signal $S_t$ based on the first signal $S_1$ and the second signal $S_r$. In the case where the second signal $S_r$ is not output from the rotation speed detector 14 or indicates zero, or in the case where the logic circuit 18 does not receive the second signal $S_r$, the logic circuit 18 does not generate the third signal $S_t$. When the logic circuit 18 receives the second signal $S_r$ from the rotation speed detector 14, the logic circuit 18 generates and outputs the third signal $S_t$. The third signal $S_t$ causes the terminal a of the switch SW2 to be in the ON state (closed state) and causes the terminal b of the switch SW2 to be in the OFF state (open state). Thus, the control signal (mute signal) $S_3$ is supplied from the ground to the actuator controller 12. The control signal (mute signal) $S_3$ is used to instruct the actuator controller 12 to stop the operation for controlling the actuator 7. That is, the control signal (mute signal) $S_3$ is used to instruct the actuator controller 12 to release the objective lens 5 from the retracted state. The actuator controller 12 stops the operation for controlling the actuator 7 based on the control signal (mute signal) $S_3$ to release the objective lens 5 from the retracted state. When the objective lens 5 is released from the retracted state, the rotation of the optical disc 2 is stopped or almost stopped. Thus, even if the edge or protector portion of the objective lens 5 contact the recording surface of the optical disc 2 due to the release of the objective lens 5 from the retracted state, the recording surface of the optical disc 2 is not scratched.

FIGS. 3A to 3G show the operating states of the parts when an overcurrent is detected in the actuator included in the optical disc apparatus shown in FIG. 1. In each of FIGS. 3A to 3G, time is plotted along an abscissa axis.

FIG. 3A shows a change in the level of the first signal $S_1$ output from the overcurrent detector 15 when the overcurrent detector 15 detects an overcurrent in the actuator 7 of the optical pickup 4 at a time $t_s$. FIG. 3B shows a change in the level of the enable signal $S_2$ supplied from the DSP 16 to the laser controller 13. FIG. 3C shows a change in the level (laser output level) P of the laser beam output from the laser diode 6. FIG. 3D shows a change in the level of the RF signal $S_{RF}$. FIG. 3E shows a change in the position of the objective lens 5 (controlled by the actuator 7) in a direction in which a focus of the objective lens 5 is adjusted. FIG. 3F shows a change in the rotation speed n of the optical disc 2. FIG. 3G shows a change in the level of the second signal $S_r$ output from the rotation speed detector 14.

In FIG. 3D, the level of the RF signal $S_{RF}$ is in a range from the minimum value $S_{RF2}$ to the maximum value $S_{RF1}$ before the time $t_s$ since the recording operation or the reproduction operation by the optical disc apparatus is in progress and the laser output level P is a steady value $P_0$ before the time $t_s$. As the laser output level P is reduced after the time $t_s$, the level of the RF signal $S_{RF}$ is reduced. The level of the RF signal $S_{RF}$ is compared with a predetermined standard value (threshold level) $S_{RFd}$ by the microcomputer 161 included in the DSP 16. When the level of the RF signal $S_{RF}$ is equal to or smaller than the predetermined standard value $S_{RFd}$ at a time $t_1$, the microcomputer 161 instructs the actuator controller 12 to control the actuator 7 so as to set the objective lens 5 from the focus-controlled state to the retracted state. In the retracted state, a direct current voltage (used to retract the objective lens 5) is applied. In FIG. 3E, a symbol $d_s$ indicates the position of the objective lens 5 that is in the focus-controlled state, and a symbol $d_p$ indicates the position of the objective lens 5 that is in the retracted state. In FIG. 3E, a symbol $d_O$ indicates the position (in the direction in which the focus of the objective lens 5 is adjusted) of the objective lens 5 released from the retracted state. The disc motor 3 stops operating at the time $t_s$. After the time $t_s$, the brake force is exerted and the rotation speed of the disc motor 3 is reduced. Thus, after the time $t_s$, the rotation speed of the optical disc 2 is gradually reduced as shown in FIG. 3F. The rotation speed n of the optical disc 2 is detected by the rotation speed detector 14 and compared with a standard value (rotation speed threshold level) $n_d$ (shown in FIG. 3F) by the rotation speed detector 14. When the rotation speed n is equal to or smaller than the standard value $n_d$, the rotation speed detector 14 outputs the second signal $S_r$ at a time $t_E$ (later than $t_2$) which is equal to or smaller than the standard value $n_d$. As a result, the logic circuit 18 receives the second signal $S_r$ from the rotation speed detector 14 and receives the first signal $S_1$ from the overcurrent detector 15. Thus, the logic circuit 18 generates the third signal $S_t$. The third signal $S_t$ controls the switch SW2 at the time $t_E$ to allow the control signal (mute signal) $S_3$ to be supplied from the ground to the actuator controller 12. The actuator controller 12 stops the operation for controlling the actuator 7 based on the control signal (mute signal) $S_3$ to release the objective lens 5 from the retracted state as shown in FIG. 3E.

FIG. 4 is a flowchart showing operations of the optical disc apparatus shown in FIG. 1 after an overcurrent is detected in the actuator included in the optical disc apparatus.

(1) During the operation for recording information on the optical disc 2 or the operation for reproducing information from the optical disc 2, the overcurrent detector 15 performs an operation for detecting an overcurrent flowing in the actuator 7 included in the optical pickup 4 and a series of operations related to the detection operation is then performed in step S401 shown in FIG. 4.

(2) When the overcurrent detector 15 performs the operation for detecting an overcurrent flowing in the actuator 7 included in the optical pickup 4, the microcomputer 161 included in the DSP 16 determines whether or not an overcurrent is detected or whether or not the overcurrent detector 15 outputs the first signal $S_1$ in step S402.

(3) When the overcurrent detector 15 outputs the first signal $S_1$ as a result of the determination, the first signal $S_1$ is input to the switch SW1 to switch the connection state of the switch SW1 and thereby stop the supply of the enable signal $S_2$ from the DSP 16 to the laser controller 13 in step S403. The first signal $S_1$ is also input to the switch SW3 to switch the connection state of the switch SW3 and thereby permit the supply of the control signal $S_4$ from the ground to the motor controller 11 in step S403. The control signal $S_4$ is used to instruct the disc motor 3 to stop operating and exert the brake force.

(4) Since the supply of the enable signal $S_2$ to the laser controller 13 is stopped, the laser drive circuit 131 stops the operation for driving the laser diode 6 to ensure that the laser diode 6 stops outputting the laser beam in step S404.

(5) Since the output of the laser beam is stopped, the level of the RF signal $S_{RF}$ (generated by the optical pickup 4 based on the laser beam reflected on the optical disc 2) is gradually reduced to zero. The microcomputer 161 determines whether or not the level of the RF signal $S_{RF}$ received by the DSP 16 through the AFE 17 is equal to or smaller than a predetermined standard value ($S_{RFd}$ shown in FIG. 3D) in step S405.

(6) When the level of the RF signal $S_{RF}$ received by the DSP 16 through the AFE 17 is equal to or smaller than the predetermined standard value $S_{RFd}$, the microcomputer 161 generates a control signal that is used to instruct the actuator controller 12 to control the actuator 7 in order to cause the objective lens 5 to be in the retracted state in the DSP 16. The DSP 16 transmits this control signal to the actuator controller 12. The actuator controller 12 receives the control signal from the DSP 16 and then controls the actuator 7 to retract the objective lens 5 or to cause the objective lens 5 to be in the retracted state in step S406. In order to cause the objective lens 5 to be in the retracted state, the objective lens 5 is moved to a location at which the edge or protector portion of the objective lens 5 is separated from the recording surface of the optical disc 2 with a gap larger than the deviation (of the recording surface of the rotating optical disc 2) from the recording surface of the optical disc 2 rotating without the axial deviation.

(7) When the disc motor 3 stops operating and the brake force is exerted, the rotation speed of the disc motor 3 is gradually reduced and the rotation speed of the optical disc 2 is also reduced. In the rotation speed reduction state, the rotation speed detector 14 detects the rotation speed of the optical disc 2 or the rotation speed of the disc motor 3 and determines whether or not the detected rotation speed is equal to or smaller than the predetermined standard value (rotation speed threshold level) $n_d$ (shown in FIG. 3F) in step S407.

(8) When the rotation speed of the optical disc 2 or the rotation speed of the disc motor 3 is equal to or smaller than the predetermined standard value $n_d$ as a result of the determination in step S407, the rotation speed detector 14 outputs the second signal $S_r$. Then, the logic circuit 18 receives the second signal $S_r$ and the first signal $S_1$. The logic circuit 18 therefore generates and outputs the third signal $S_t$. The third signal $S_t$ switches the connection state of the switch SW2 to cause the switch SW2 to permit the supply of the control signal (mute signal) $S_3$ from the ground to the actuator controller 12. The control signal (mute signal) $S_3$ is used to instruct the actuator controller 12 to stop the operation for controlling the actuator 7, or is used to instruct the actuator controller 12 to release the objective lens 5 from the retracted state. The actuator controller 12 stops the operation for controlling the actuator 7 based on the control signal (mute signal) $S_3$ and releases the objective lens 5 from the retracted state in step S408.

(9) When the rotation speed of the optical disc 2 or the rotation speed of the disc motor 3 is larger than the predetermined standard value $n_d$ as a result of the determination in step S407, the operation for controlling the actuator 7 is not stopped and the objective lens 5 remains in the retracted state.

(10) After the objective lens 5 is released from the retracted state in step S408, the edge or protector portion of the objective lens 5 comes in contact with the recording surface of the optical disc 2 that is not in a rotating state. Under the condition that the edge or protector portion of the objective lens 5 is in contact with the recording surface of the optical disc 2 that is not in the rotating state, the series of operations performed after the operation for detecting the overcurrent in the actuator 7 are terminated in step S409.

According to the present embodiment, the objective lens 5 is set to be in the retracted state by the actuator 7 when an overcurrent is detected in the actuator 7 of the optical disc apparatus. In this case, objective lens 5 is in the retracted state until the rotation of the optical disc 2 is stopped or almost stopped. Thus, the edge or protector portion of the objective lens 5 does not contact the recording surface of the optical disc 2 even when a deviation of the rotational axis of the optical disc 2 occurs. This prevents the recording surface of the optical disc 2 from being scratched. In the present embodiment, when an overcurrent is detected in the actuator 7, the rotation speed of the disc motor 3 is reduced under the condition that the brake force is exerted. After the overcurrent is detected, it is possible to stop the rotation of the optical disc 2 for a short time.

In the present embodiment, when the detected rotation speed of the optical disc 2 or the detected rotation speed of the disc motor 3 is equal to or smaller than the predetermined standard value as a result of the determination, the rotation speed detector 14 outputs the second signal $S_r$. When the detected rotation speed of the optical disc 2 or the detected rotation speed of the disc motor 3 is larger than the predetermined standard value, the rotation speed detector 14 does not output the second signal $S_r$. The rotation speed detector 14, however, may be configured to prevent the second signal $S_r$ from being output when the detected rotation speed of the optical disc 2 or the detected rotation speed of the disc motor 3 is equal to or smaller than the predetermined standard value and to output the second signal $S_r$ when the detected rotation speed of the optical disc 2 or the detected rotation speed of the disc motor 3 is larger than the predetermined standard value. In response to this configuration of the rotation speed detector 14, the logic circuit 18 may be configured to generate and output the third signal $S_t$ when the logic circuit 18 receives the first signal $S_1$ and does not receive the second signal $S_r$, and to prevent the third signal $S_t$ from being generated when the logic circuit 18 receives the first signal $S_1$ and the second signal $S_r$. In the present embodiment, the microcomputer 161 is included in the DSP 16 serving as the controller. The microcomputer 161, however, may not be included in the DSP 16. In the present embodiment, the rotation speed detector 14 compares the detected rotation speed with the predetermined standard value (rotation speed threshold level). However, the DSP 16 or the microcomputer 161 may perform the comparison.

According to the present invention, the optical disc apparatus having the function of monitoring a current flowing in the actuator provided in the optical pickup prevents the recording surface of the optical disc from being scratched due to the contact of the objective lens therewith, even when an overcurrent is detected in the actuator of the optical pickup and the actuator controller stops the operation for controlling the actuator.

The present invention is not limited to the aforementioned embodiment without departing from the spirit and main features of the present invention. The scope of the present invention is defined in the appended claims. It is intended that the appended claims include all such modifications, permutations and equivalents as fall within the spirit and scope of the present invention.

What is claimed is:

1. An optical disc apparatus including a function of monitoring a current flowing in an actuator provided in an optical pickup, the optical disc apparatus comprising:
   a disc motor for rotationally driving the optical disc;
   a motor controller for controlling a rotation speed of the disc motor;
   an overcurrent detector for detecting an overcurrent flowing in the actuator and instructing the disc motor to stop operating and exert brake force based on the result of the detection;
   an actuator controller for controlling the actuator to cause an objective lens to be in a retracted state under the condition that an operation for controlling a focus of the objective lens is stopped, the objective lens being separated from a recording surface of the optical disc in the retracted state; and
   a rotation speed detector for detecting a rotation speed of the optical disc or the rotation speed of the disc motor;
   wherein when an overcurrent is detected in the actuator under the condition that a recording operation or reproduction operation is performed and the focus of the objective lens is controlled, the rotation speed of the optical disc is reduced,
   the actuator is controlled to cause the objective lens to be in the retracted state under the condition that the disc motor stops operating and exerts brake force, and the operation for controlling the focus of the objective lens is stopped, the objective lens being separated from the recording surface of the optical disc until the rotation speed of the optical disc becomes equal to or smaller than a predetermined value, and
   when the rotation speed of the optical disc is equal to or smaller than the predetermined value, the objective lens is released from the retracted state.

2. An optical disc apparatus including a function of monitoring a current flowing in an actuator provided in an optical pickup, the optical disc apparatus comprising:
   a disc motor for rotationally driving the optical disc;
   a motor controller for controlling a rotation speed of the disc motor;
   a laser diode for generating and emitting a laser beam;
   a laser controller for driving and controlling the laser diode;
   an objective lens for collecting the laser beam emitted by the laser diode and irradiating the optical disc with the laser beam;
   an actuator for driving and positioning the objective lens;
   an actuator controller for controlling the actuator to cause the objective lens to be in a focus-controlled state or in a retracted state in which an operation for controlling a focus of the objective lens is not performed and the objective lens is separated from a recording surface of the optical disc;
   a controller for generating and outputting first to third control signals, the first control signal being used to control the motor controller, the second control signal being used to control the laser controller, the third control signal being used to control the actuator controller;
   an overcurrent detector for detecting an overcurrent flowing in the actuator, generating a first signal based on the result of the detection, and outputting the first signal to permit supply of the first control signal from the controller to the motor controller, the first control signal being used to instruct the disc motor to stop operating and exert brake force;
   a rotation speed detector for detecting a rotation speed of the optical disc or the rotation speed of the disc motor, and generating and outputting a second signal based on the detected rotation speed; and
   a logic circuit for generating and outputting a third signal based on the first and second signals when the level of the second signal is equal to or smaller than a standard value, the third signal being used to permit supply of the third control signal from the controller to the actuator controller, the third control signal being used to instruct the actuator controller to stop an operation for controlling the actuator;
   wherein when the overcurrent detector detects an overcurrent flowing in the actuator during a recording operation or reproduction operation, the actuator controller controls the actuator to cause the objective lens to be in a retracted state under the condition that the disc motor exerts the brake force, and the objective lens is in the retracted state until the rotation speed of the optical disc becomes equal to or smaller than a predetermined value, and
   when the rotation speed of the optical disc becomes equal to or smaller than the predetermined value, the actuator controller stops the operation for controlling the actuator to release the objective lens from the retracted state.

3. The optical disc apparatus according to claim 2, wherein the controller determines the level of a radio frequency signal generated based on a laser beam reflected on the optical disc, and generates the third control signal when the level of the radio frequency signal is equal to or smaller than a standard value, the generated third control signal being used to instruct the actuator controller to control the actuator to cause the objective lens to be in the retracted state.

4. The optical disc apparatus according to claim 3, wherein the overcurrent detector stops supply of the second control signal from the controller to the laser controller based on the first signal, the second control signal being used to instruct the laser diode to output a laser beam.

5. The optical disc apparatus according to claim 3, further comprising a switch that is provided between the controller and the actuator controller and adapted to permit and stop the supply of the third control signal from the controller to the actuator controller, the third control signal being used to instruct the actuator controller to stop the operation for controlling the actuator, wherein
   the switch is turned on and off based on the third signal output from the logic circuit.

6. The optical disc apparatus according to claim 5, further comprising a switch that is provided between the controller and the laser controller and adapted to permit and stop supply of the second control signal from the controller to the laser controller, the second control signal being used to instruct the laser diode to output a laser beam, wherein
the switch operates to stop the supply of the second control signal based on the first signal output from the overcurrent detector.

7. The optical disc apparatus according to claim 6, further comprising a switch that is provided between the controller and the motor controller and adapted to permit and stop supply of the first control signal from the controller to the motor controller, the first control signal being used to instruct the disc motor to exert the brake force, wherein
the switch operates to permit the supply of the first control signal based on the first signal output from the overcurrent detector.

8. The optical disc apparatus according to claim 5, further comprising a switch that is provided between the controller and the motor controller and adapted to permit and stop supply of the first control signal from the controller to the motor controller, the first control signal being used to instruct the disc motor to exert the brake force, wherein
the switch operates to permit the supply of the first control signal based on the first signal output from the overcurrent detector.

9. The optical disc apparatus according to claim 5, further comprising a switch that is provided between the controller and the laser controller and adapted to permit and stop supply of the second control signal from the controller to the laser controller, the second control signal being used to instruct the laser diode to output a laser beam, wherein
the switch is turned on and off based on the third signal output from the logic circuit.

10. The optical disc apparatus according to claim 9, further comprising a switch that is provided between the controller and the motor controller and adapted to permit and stop the supply of the first control signal from the controller to the motor controller, the first control signal being used to instruct the disc motor to exert the brake force, wherein
the switch operates to permit the supply of the first control signal from the controller to the motor controller based on the first signal output from the overcurrent detector.

11. The optical disc apparatus according to claim 5, further comprising a switch that is provided between the controller and the motor controller and adapted to permit and stop the supply of the first control signal from the controller to the motor controller, the first control signal being used to instruct the disc motor to exert the brake force, wherein
the switch operates to permit the supply of the first control signal from the controller to the motor controller based on the first signal output from the overcurrent detector.

12. The optical disc apparatus according to claim 2, wherein
the overcurrent detector stops supply of the second control signal from the controller to the laser controller based on the first signal, the second control signal being used to instruct the laser diode to output a laser beam.

13. The optical disc apparatus according to claim 2, wherein
when an overcurrent is detected and the rotation speed of the optical disc is equal to or smaller than the predetermined value, the logic circuit generates and outputs a signal to stop supply of the second control signal from the controller to the laser controller based on the first signal, the second control signal being used to instruct the laser diode to output a laser beam.

14. The optical disc apparatus according to claim 2, further comprising a switch that is provided between the controller and the actuator controller and adapted to permit and stop the supply of the third control signal from the controller to the actuator controller, the third control signal being used to instruct the actuator controller to stop the operation for controlling the actuator, wherein
the switch is turned on and off based on the third signal output from the logic circuit.

15. The optical disc apparatus according to claim 14, further comprising a switch that is provided between the controller and the laser controller and adapted to permit and stop supply of the second control signal from the controller to the laser controller, the second control signal being used to instruct the laser diode to output a laser beam, wherein
the switch operates to stop the supply of the second control signal based on the first signal output from the overcurrent detector.

16. The optical disc apparatus according to claim 15, further comprising a switch that is provided between the controller and the motor controller and adapted to permit and stop supply of the first control signal from the controller to the motor controller, the first control signal being used to instruct the disc motor to exert the brake force, wherein
the switch operates to permit the supply of the first control signal based on the first signal output from the overcurrent detector.

17. The optical disc apparatus according to claim 14, further comprising a switch that is provided between the controller and the motor controller and adapted to permit and stop the supply of the first control signal from the controller to the motor controller, the first control signal being used to instruct the disc motor to exert the brake force, wherein
the switch operates to permit the supply of the first control signal based on the first signal output from the overcurrent detector.

18. The optical disc apparatus according to claim 14, further comprising a switch that is provided between the controller and the laser controller and adapted to permit and stop supply of the second control signal from the controller to the laser controller, the second control signal being used to instruct the laser diode to output a laser beam, wherein
the switch is turned on and off based on the third signal output from the logic circuit.

19. The optical disc apparatus according to claim 18, further comprising a switch that is provided between the controller and the motor controller and adapted to permit and stop the supply of the first control signal from the controller to the motor controller, the first control signal being used to instruct the disc motor to exert the brake force, wherein
the switch operates to permit the supply of the first control signal from the controller to the motor controller based on the first signal output from the overcurrent detector.

20. The optical disc apparatus according to claim 14, further comprising a switch that is provided between the controller and the motor controller and adapted to permit and stop the supply of the first control signal from the controller to the motor controller, the first control signal being used to instruct the disc motor to exert the brake force, wherein
the switch operates to permit the supply of the first control signal from the controller to the motor controller based on the first signal output from the overcurrent detector.

* * * * *